Oct. 29, 1929.  B. H. ZEIBIG  1,734,025

RUBBER SHACKLE AND METHOD OF MAKING SAME

Filed Jan. 12, 1928

Inventor
B. Henri Zeibig
By Blackmore, Spencer & Fluch
Attorneys

Patented Oct. 29, 1929

1,734,025

UNITED STATES PATENT OFFICE

BRUNO HENRI ZEIBIG, OF FLINT, MICHIGAN, ASSIGNOR TO A C SPARK PLUG COMPANY, OF FLINT, MICHIGAN, A COMPANY OF MICHIGAN

RUBBER SHACKLE AND METHOD OF MAKING SAME

Application filed January 12, 1928. Serial No. 246,199.

This invention relates to motor vehicles and more particularly to an elastic bushing for spring shackles.

One of the objects of the invention is to provide an improved bushing, comprising a body of elastic deformable material interposed between a pair of concentric sleeves, the torsional deformation of which body accommodates the swinging movement of the shackle upon spring deflection.

A further object of the invention is to provide an elastic joint which will be resistant to side sway.

Another object of the invention is to provide a sleeve member upon which projections may be formed to extend into the elastic body, after it has been placed between the sleeves and under initial compression.

A still further object of the invention is to provide an improved method of assembling the bushing and providing projections on a sleeve to interlock with the elastic body.

Other objects and advantages will be apparent from the following specification and the accompanying drawing wherein—

Figure 1:
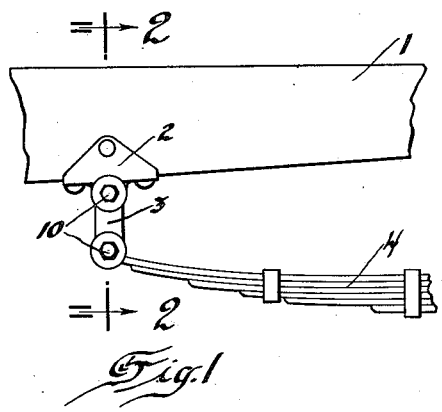
Fig. 1 is a side elevation showing a spring shackle connection between a chassis frame and the end of a vehicle spring.
Figure 2:
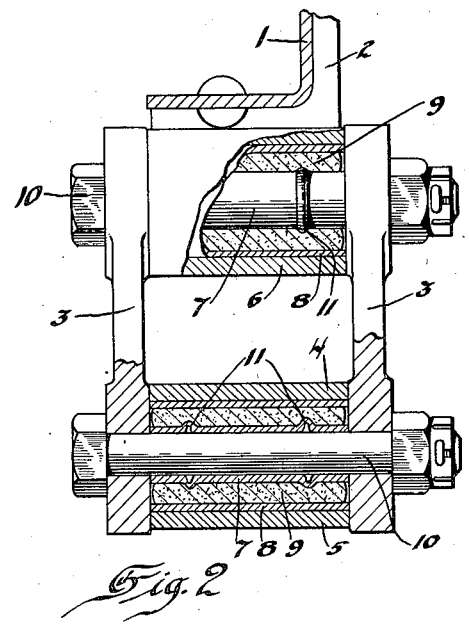
Fig. 2 is a view of the shackle assembly partly in section as having been taken on line 2—2 of Fig. 1.

Referring to the drawing, the reference character 1 indicates one of the members of a chassis frame, having a bracket 2 on the underside thereof connected by swinging shackle links 3 to a vehicle spring 4. The end of the main leaf of the spring is curled to form an eye 5, and bracket 2 is also provided with an eye portion 6. In each eye is located a bushing, consisting of inner and outer concentric sleeves 7 and 8, respectively, having interposed therebetween a body 9 of rubber or other similar elastic material, the body 9 preferably being initially compressed to eliminate excessive responsiveness to deformation and to limit its resiliency. Long bolts 10—10 at the ends of the shackle links 3 extend through the inner sleeves 7 and are preferably serrated throughout a portion of their extent to insure a tight fit and to hold the sleeve against movement relative to shackle links. It will be understood that the outer sleeve 8 also has a tight fit in the eye, so that upon swinging of the shackle links the elastic body 9 is subjected to torsional deformation to accommodate the relative movement of the inner and outer sleeves.

In order to eliminate side sway or relative axial movement between the bushing parts, such as may have a tendency to occur under centrifugal action when the vehicle is negotiating a sharp curve, a pair of spaced annular beads or projections 11 are provided on the inner sleeve to extend into the rubber body 9. The formation of these beads is the thing with which this invention is particularly concerned.

Figure 3:
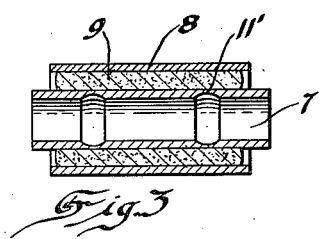
Fig. 3 is a detail sectional view of the bushing prior to the final assembly operation.

A preferred method of making the bushing consists in providing an inner sleeve of slightly longer extent than the outer sleeve, and which has a pair of spaced annular grooves 11' preferably of semi-circular or sector shape, and having a depth of substantially one-half of the wall of the sleeve. After the rubber body has been interposed between the two sleeves under an initial compression, so that the ends of the inner sleeve extend beyond the outer sleeve an equal distance on either side as shown in Fig. 3, the inner sleeve is subject to endwise pressure causing the weakened portions at each groove to bulge or buckle and bend upon itself, forming the beads 11, which are forced into the rubber body, and cutting down the length of the sleeve to correspond with that of the outer sleeve.

The diameter of such beads depends upon and varies with the width of the grooves or weakened portions of the sleeve. Therefore, the size of the beads may be controlled by increasing or decreasing the size of the grooves or the extent of the portions which are to be buckled.

Figure 5:
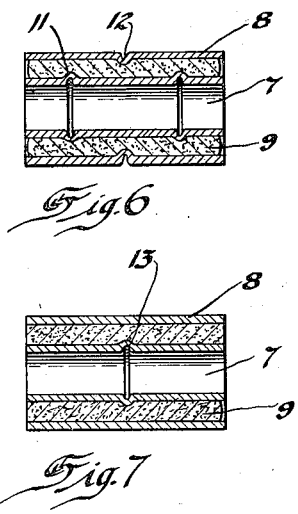
Fig. 5 is a view illustrating one method effecting the final assembly operation.

Figure 5 illustrates a suitable manner of placing the sleeve under pressure, wherein 12 is the bed of a press having an upstanding stud 13, and 14 is a movable head with a dependent stud 15, the two studs 13 and 15 projecting into the inner sleeve to prevent distortion of the sleeve under the pressure exerted upon it.

Figure 6:
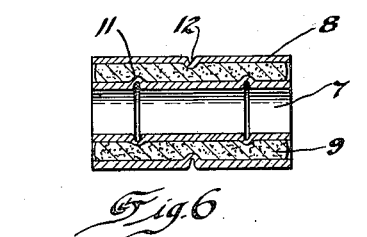
Figs. 6 and 7 are sectional views showing alternative structural forms of the bushing.
Figure 4:
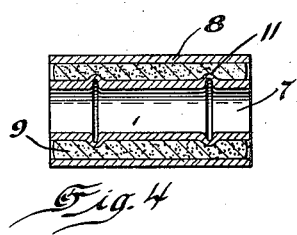
Fig. 4 is a detail sectional view of the completed bushing.
Figure 7:
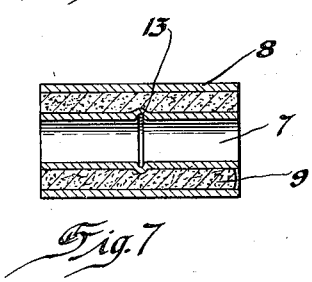

In addition to forming the beads 11 on the inner sleeve, it may in certain installations be desirable to provide in a similar manner an inwardly projecting bead 12 on the outer sleeve as is shown in Figure 6. In other cases it may be found that a single bead 13 on the inner sleeve, as in Figure 7, will be sufficient to hold the rubber against sidewise sliding.

I claim:

1. A method of making an elastic bushing consisting of cutting away a portion of a sleeve, interposing a body of deformable material between said sleeve and a second sleeve, and then causing the material of the first mentioned sleeve adjacent to the place where the portion was cut away to become bulged so as to project into the body of deformable material.

2. A method of making an elastic bushing consisting of forming the wall of a sleeve with a weakened portion, interposing a body of elastic material between said sleeve and a second sleeve, and applying pressure on said first mentioned sleeve to buckle the weakened portion thereof so that it projects into said elastic body.

3. A method of making an elastic bushing consisting of forming a sleeve with a portion of the wall thereof of less thickness than the remainder of the wall, interposing a body of elastic material under pressure between said sleeve and a second sleeve, and thereafter applying endwise pressure on the first mentioned sleeve to distort said wall portion into interlocking engagement with said elastic body.

4. A method of making an elastic bushing, consisting of forming an annular groove in one surface of a sleeve, providing an intermediate elastic body between said sleeve and a second sleeve, and placing said first mentioned sleeve under endwise pressure, whereby the material thereof adjacent said groove becomes crowded upon itself to form an annular bead extending into said elastic body.

5. A method of making an elastic bushing consisting of forming a semi-circular annular groove in the surface of a sleeve, to a depth of substantially half the thickness of the sleeve, interposing an elastic body between said sleeve and a second sleeve, and thereafter placing said sleeve under endwise pressure whereby the material of said sleeve adjacent the groove is caused to bend upon itself and provide an annular bead which projects into said elastic body.

6. A method of making an elastic bushing consisting of forming annular grooves in the surfaces of a pair of concentric sleeves, interposing a body of elastic material between said sleeves, and thereafter applying endwise pressure on the respective sleeves to buckle the portions thereof adjacent said grooves into interlocking engagement with the intermediate elastic body.

7. A method of assembling an elastic bushing comprising inner and outer sleeves and an intermediate body of elastic material, which includes the placing of one of said sleeves under pressure to cause portions thereof to deform and project into the elastic body.

8. A method of assembling an elastic bushing comprising concentric sleeves and an intermediate elastic body, which includes the placing of said sleeves under endwise pressure to cause pre-weakened portions thereof to buckle and extend into said elastic body.

9. In a unit of the character described, a pair of axially arranged sleeves disposed one within the other and an elastic deformable bushing interposed between said sleeves, one of said sleeves having a weakened wall portion which is adapted to be forced out of the plane of the sleeve to form a protuberance that extends into the elastic bushing to resist relative axial movement of the sleeve and bushing.

10. In a unit of the character described, a pair of concentric sleeves adapted for movement relative to each other, a body of cushioning material between the sleeves which permits the relative movement of the sleeves, one of said sleeves having an annular grooved wall portion of less thickness than the remainder of the wall, which is bent upon itself and forms an annular bead projecting into the cushioning material.

11. In a unit of the character described, a series of alternately arranged sheet metal and rubber sleeves nested one within the other, with a sheet metal sleeve having a sector-shaped groove which extends annularly throughout one of its surfaces, the material adjacent said groove being buckled to form an annular bead on the other surface of the sleeve upon the application of endwise pressure, the bead projecting into the adjacent surface of the adjacent rubber sleeve.

12. In a unit of the character described, a pair of sleeves and a body of deformable material interposed between said sleeves, one of the sleeves having a weakened wall portion bent out of the plane of the sleeve and projecting into said deformable material.

13. In a unit of the character described, an inner and an outer sleeve and a bushing of rubber there-between, one of said sleeves having an annular groove in the surface thereof removed from the rubber bushing, the material at the groove being bent upon itself under the action of pressure on the ends of said sleeve, to form an annular bead on the surface of the sleeve adjacent the rubber bushing and which extends into the surface of said bushing, the size of said bead being variable in accordance with the width of said groove.

In testimony whereof I affix my signature.
B. HENRI ZEIBIG.